United States Patent
Li et al.

(10) Patent No.: US 7,881,188 B2
(45) Date of Patent: Feb. 1, 2011

(54) METHODS, SYSTEMS, AND COMPUTER PROGRAM PRODUCTS FOR IMPLEMENTING LINK REDUNDANCY IN A MEDIA GATEWAY

(75) Inventors: San-qi Li, Plano, TX (US); Edward Y. Qian, Plano, TX (US); David Z. Lu, Dallas, TX (US)

(73) Assignee: Genband US LLC, Plano, TX (US)

( * ) Notice: Subject to any disclaimer, the term of this patent is extended or adjusted under 35 U.S.C. 154(b) by 518 days.

(21) Appl. No.: 11/702,009

(22) Filed: Feb. 2, 2007

(65) Prior Publication Data

US 2007/0183314 A1 Aug. 9, 2007

Related U.S. Application Data

(60) Provisional application No. 60/765,066, filed on Feb. 3, 2006.

(51) Int. Cl.
*G01R 31/08* (2006.01)

(52) U.S. Cl. ........................ 370/217; 370/220

(58) Field of Classification Search ............ None
See application file for complete search history.

(56) References Cited

U.S. PATENT DOCUMENTS

| | | |
|---|---|---|
| 5,818,842 A | 10/1998 | Burwell et al. |
| 5,938,732 A | 8/1999 | Lim et al. |
| 5,986,662 A | 11/1999 | Argiro et al. |
| 6,052,733 A | 4/2000 | Mahalingam et al. |
| 6,061,348 A | 5/2000 | Castrigno et al. |
| 6,111,880 A | 8/2000 | Rusu et al. |
| 6,229,538 B1 | 5/2001 | McIntyre et al. |
| 6,272,113 B1 | 8/2001 | McIntyre et al. |
| 6,308,282 B1 | 10/2001 | Huang et al. |
| 6,363,497 B1 | 3/2002 | Chrabaszcz |
| 6,381,218 B1 | 4/2002 | McIntyre et al. |
| 6,512,774 B1 | 1/2003 | Vepa et al. |
| 6,633,563 B1 | 10/2003 | Lin et al. |

(Continued)

FOREIGN PATENT DOCUMENTS

EP  1 668 471 A2  4/2005

(Continued)

OTHER PUBLICATIONS

"FHRP—VRRP Enhancements," Cisco IOS Release 12.3(14)T, Cisco Systems, pp. 1-28 (Copyright 2005).

(Continued)

*Primary Examiner*—Phirin Sam
(74) *Attorney, Agent, or Firm*—Jenkins, Wilson, Taylor & Hunt, P.A.

(57) ABSTRACT

Methods, systems, and computer program products for implementing link redundancy in a media gateway are provided according to one method, a media gateway link protection group is provisioned to associate with a common VLAN a common virtual local area network (VLAN) primary and secondary links associated with at least one line card in a media gateway. The primary and secondary links are connected using a cross connection between ports associated with the at least one line card. At run time, traffic is automatically bridged between the primary and secondary links using the common VLAN and the cross connection.

20 Claims, 7 Drawing Sheets

U.S. PATENT DOCUMENTS

| | | |
|---|---|---|
| 6,714,535 B1 | 3/2004 | Herh |
| 6,728,780 B1 | 4/2004 | Hebert |
| 6,738,826 B1 | 5/2004 | Moberg et al. |
| 6,741,585 B1 | 5/2004 | Munoz et al. |
| 6,754,745 B1 | 6/2004 | Horvath et al. |
| 6,763,479 B1 | 7/2004 | Hebert |
| 6,766,482 B1 | 7/2004 | Yip et al. |
| 6,771,673 B1 | 8/2004 | Baum et al. |
| 6,778,491 B1 | 8/2004 | Fourcand et al. |
| 6,850,531 B1 | 2/2005 | Rao et al. |
| 6,856,591 B1 | 2/2005 | Ma et al. |
| 6,862,564 B1 | 3/2005 | Shue et al. |
| 6,879,667 B1 | 4/2005 | Carew et al. |
| 6,891,836 B1 | 5/2005 | Chen et al. |
| 6,895,528 B2 | 5/2005 | Cantwell et al. |
| 6,910,148 B1 | 6/2005 | Ho et al. |
| 6,928,482 B1 | 8/2005 | Ben Nun et al. |
| 6,938,092 B2 | 8/2005 | Burns |
| 6,975,587 B1 | 12/2005 | Adamski et al. |
| 7,177,943 B1 | 2/2007 | Temoshenko et al. |
| 7,185,094 B2 | 2/2007 | Marquette et al. |
| 7,212,519 B2 | 5/2007 | Johnson et |
| 7,233,567 B1 | 6/2007 | Li |
| 7,239,605 B2 | 7/2007 | Dinker et al. |
| 7,263,060 B1 | 8/2007 | Garofalo et al. |
| 7,289,487 B2 * | 10/2007 | Jang ............................ 370/352 |
| 7,293,080 B1 * | 11/2007 | Clemm et al. ................ 709/223 |
| 7,424,025 B2 | 9/2008 | Qian et al. |
| 2002/0012352 A1 | 1/2002 | Hansson et al. |
| 2002/0016926 A1 | 2/2002 | Nguyen et al. |
| 2002/0051464 A1 | 5/2002 | Sin et al. |
| 2002/0191612 A1 | 12/2002 | Curtis |
| 2003/0118039 A1 | 6/2003 | Nishi et al. |
| 2003/0142795 A1 | 7/2003 | Gavette et al. |
| 2003/0172319 A1 * | 9/2003 | Ryhorchuk et al. ........... 714/27 |
| 2003/0174729 A1 | 9/2003 | Heink et al. |
| 2004/0008722 A1 * | 1/2004 | Ellis et al. .................... 370/461 |
| 2004/0030757 A1 | 2/2004 | Pandya |
| 2004/0066782 A1 | 4/2004 | Nassar |
| 2004/0071142 A1 | 4/2004 | Moriwaki et al. |
| 2004/0131064 A1 | 7/2004 | Burwell et al. |
| 2005/0053073 A1 | 3/2005 | Kloth et al. |
| 2005/0185577 A1 | 8/2005 | Sakamoto et al. |
| 2005/0243716 A1 | 11/2005 | Bitar et al. |
| 2005/0281190 A1 | 12/2005 | McGee et al. |
| 2006/0143309 A1 | 6/2006 | McGee et al. |
| 2006/0268686 A1 * | 11/2006 | Shei et al. .................... 370/217 |
| 2007/0083528 A1 | 4/2007 | Matthews et al. |
| 2008/0317055 A1 | 12/2008 | Zetterlund et al. |
| 2009/0092044 A1 | 4/2009 | Saito |

FOREIGN PATENT DOCUMENTS

| | | |
|---|---|---|
| WO | WO 2005/033889 A2 | 4/2005 |
| WO | WO 2006/128005 A2 | 11/2006 |

OTHER PUBLICATIONS

Interview Summary for U.S. Appl. No. 11/240,317 (Jun. 22, 2010).
Final Official Action for U.S. Appl. No. 11/240,317 (Jun. 14, 2010).
Final Official Action for U.S. Appl. No. 11/139,019 (Apr. 27, 2010).
Commonly-assigned, co-pending U.S. Appl. No. 12/700,444 for "Systems, Methods, and Computer Readable Media for Providing Instantaneous Failover of Packet Processing Elements in a Network," (Unpublished, filed Feb. 4, 2010).
Official Action for U.S. Appl. No. 11/240,317 (Dec. 16, 2009).
Non-Final Official Action for U.S. Appl. No. 11/139,019 (Oct. 28, 2009).
Advisory Action for U.S. Appl. No. 11/240,317 (Oct. 8, 2009).
Final Official Action for U.S. Appl. No. 11/240,317 (Jun. 23, 2009).
Final Official Action for U.S. Appl. No. 11/139,019 (Mar. 23, 2009).
Interview Summary for U.S. Appl. No. 11/139,019 (Jan. 27, 2009).
Official Action for U.S. Appl. No. 11/240,317 (Jan. 26, 2009).
Communication pursuant to Rules 161 and 162 EPC for European Patent Application No. 04789383.9 (Sep. 24, 2008).
Official Action for U.S. Appl. No. 11/139,019 (Sep. 17, 2008).
Official Action for U.S. Appl. No. 11/240,317 (Jun. 23, 2008).
Notification of Transmittal of the International Search Report and the Written Opinion of the International Searching Authority, or the Declaration for International Application No. PCT/US06/20456 (Oct. 20, 2006).
Communication pursuant to Rules 109 and 110 EPC for European Application No. 04789383.9 (Aug. 22, 2006).
Martini et al. "Encapsulation Methods for Transport of ATM Over MPSL Networks," Network Working Group, Internet Draft, (Apr. 2005).
Hinden, "RFC 3768—Vitural Router Redundancy Protocol (VRRP)," Internet RFC/STD/FYI/BCP Archives, 20 pages (Apr. 2004).
Yoo et al., "A Media Stream Processing of VoIP Media Gateway," IEEE, pp. 91-94 (2003).
Stern et al. "Survivability: Protection and Restoration," Multiwavelength Optical Networks, p. 610-613, (May 1999).

* cited by examiner

METHODS, SYSTEMS, AND COMPUTER PROGRAM PRODUCTS FOR IMPLEMENTING LINK REDUNDANCY IN A MEDIA GATEWAY

RELATED APPLICATIONS

This application claims the benefit of U.S. Provisional Patent Application Ser. No. 60/765,066, filed Feb. 3, 2006; the disclosure of which is incorporated herein by reference in its entirety.

TECHNICAL FIELD

The subject matter described herein relates to interfacing a media gateway to a network. More particularly the subject matter described herein relates to methods, systems, and computer program products for implementing link redundancy in a media gateway.

BACKGROUND ART

A media gateway is a device that sends and receives voice packets over a packet network and that may also interface with a circuit-switched network. On the packet side, a media gateway may send and receive voice packets over an IP network. Each connection or path between media gateways over which IP-encapsulated voice packets travel is referred to as a link, which is analogous to a channel in a circuit-switched network.

In order to provide high reliability, link redundancy is important with media gateways. One popular link redundancy design is 1:1 link redundancy where an active link, also referred to as a protected link, carries voice traffic, while a standby mate link, referred to as a protecting link, operates in a hot standby mode to take over if the active link fails. In order to achieve such redundancy, the pair of active and standby links needs to appear to the IP network as if they are in a single LAN segment. Thus, active and standby links are required to be bridged into a single LAN segment in order to achieve hot standby protection.

One existing approach to providing link redundancy is to use external Ethernet switches to switch traffic from an active link to a standby link when the active link fails. FIG. 1 illustrates an external Ethernet switch approach. In FIG. 1, media gateway 100 is connected to IP network 102 via a pair of external Ethernet switches 104 and IP edge routers 106. Media gateway 100 includes a first line card 108 functioning as an active card and a second line card 110 functioning as a standby card. Active card 108 is connected to active link 112, and standby card is connected to standby link 114.

In operation, when active link 112 fails, a card switchover occurs within media gateway 100, and Ethernet switch 104 is configured to forward traffic to standby link 114. Similarly, media gateway 100 sends outbound traffic over standby link 114.

One problem with using additional Ethernet switches to provide link redundancy is that this approach introduces additional switches in the path between media gateway 100 and edge routers 106. Adding additional Ethernet switches increases equipment costs and increases the number of potential points of failure in the network. Another problem with this approach is that a card switchover is required. As used herein, the term "card switchover" refers to one card taking over the operations of another card. In a media gateway context, a card switchover may include transitioning all of the connection information regarding which voice servers are associated with which connections from the active card to the standby card.

Another general approach to providing link redundancy is Cisco's Bridged Virtual Interface (BVI) or Switched Virtual Interface (SVI). FIG. 2 illustrates the BVI concept. In FIG. 2, traffic from a routed interface E3 can be switched to any or all of three bridged links E0-E2. One problem with this solution is that it requires that routers perform both Ethernet bridging and switching functions.

Additional problems with the BVI/SVI approach include the fact that bridged links must reside in the same hardware device, bridged links are always treated equally, and there are no hot standby NIC cards. Further problems with the BVI/SVI approach are that configuration is on a per VLAN basis, and thus support of multiple VLANs requires multiple bridges to be configured individually. Further, the BVI/SVI concept is typically applied to IP routers or Ethernet bridges, rather than end devices, such as media gateways. In addition, using a single hardware device to implement a BVI or SVI introduces a single point of failure.

Accordingly, there exists a need for methods, systems, and computer program products for implementing link redundancy in a media gateway.

SUMMARY

Methods, systems, and computer program products for implementing link redundancy in a media gateway are provided according to one method, a media gateway link protection group is provisioned to associate with a common VLAN a common virtual local area network (VLAN) primary and secondary links associated with at least one line card in a media gateway. The primary and secondary links are connected using a cross connection between ports associated with the at least one line card. At run time, traffic is automatically bridged between the primary and secondary links using the common VLAN and the cross connection.

In one exemplary implementation, an active card in the media gateway is a card that has connection information for voice over IP connections with one or more voice server modules in the media gateway. A standby card may not include connection information for connections with voice server modules in the media gateway. Accordingly, if the active link connected to the active card fails, incoming traffic bridged from the standby card may still reach the voice servers. Outbound traffic may reach the network via the active card, the cross connection, the standby card, and the standby link.

The subject matter described herein for providing link redundancy in a media gateway may achieve any one or more of the following advantages over the BVI/SVI approach:

- Two bridged links can reside on different hardware devices or network interface cards, while each device can protect the other with equipment level protection in a media gateway.
- The two bridged links according to the subject matter described herein can be treated differently with regard to preference (primary and secondary) while the BVI/SVI solution treats link equally.
- The subject matter described herein allows for revertive or non-revertive node.
- The subject matter described herein works between active and standby cards, while the BVI/SVI solution has no hot standby NIC concept.
- The subject matter described herein bridges two links physically and above the bridged links, multiple VLANs can be transparently added as needed. The BVI/SVI solution is per-VLAN-based. Thus, support of multiple VLANs would require that multiple such bridges be configured individually.

The subject matter described herein is applicable to a media gateway, where no transit bridging, switching, or even routing is required, but may be implemented.

The subject matter described herein does not present a single point of failure to the network.

The subject matter described herein for implementing link redundancy in a media gateway can be implemented using a computer program product comprising computer executable instructions embodied in a computer readable medium. Exemplary computer readable media suitable for implementing the subject matter described herein include chip memory devices, disk memory devices, programmable logic devices, and application specific integrated circuits. In addition, a computer program product that implements the subject matter described herein may be located on a single device for computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 3:
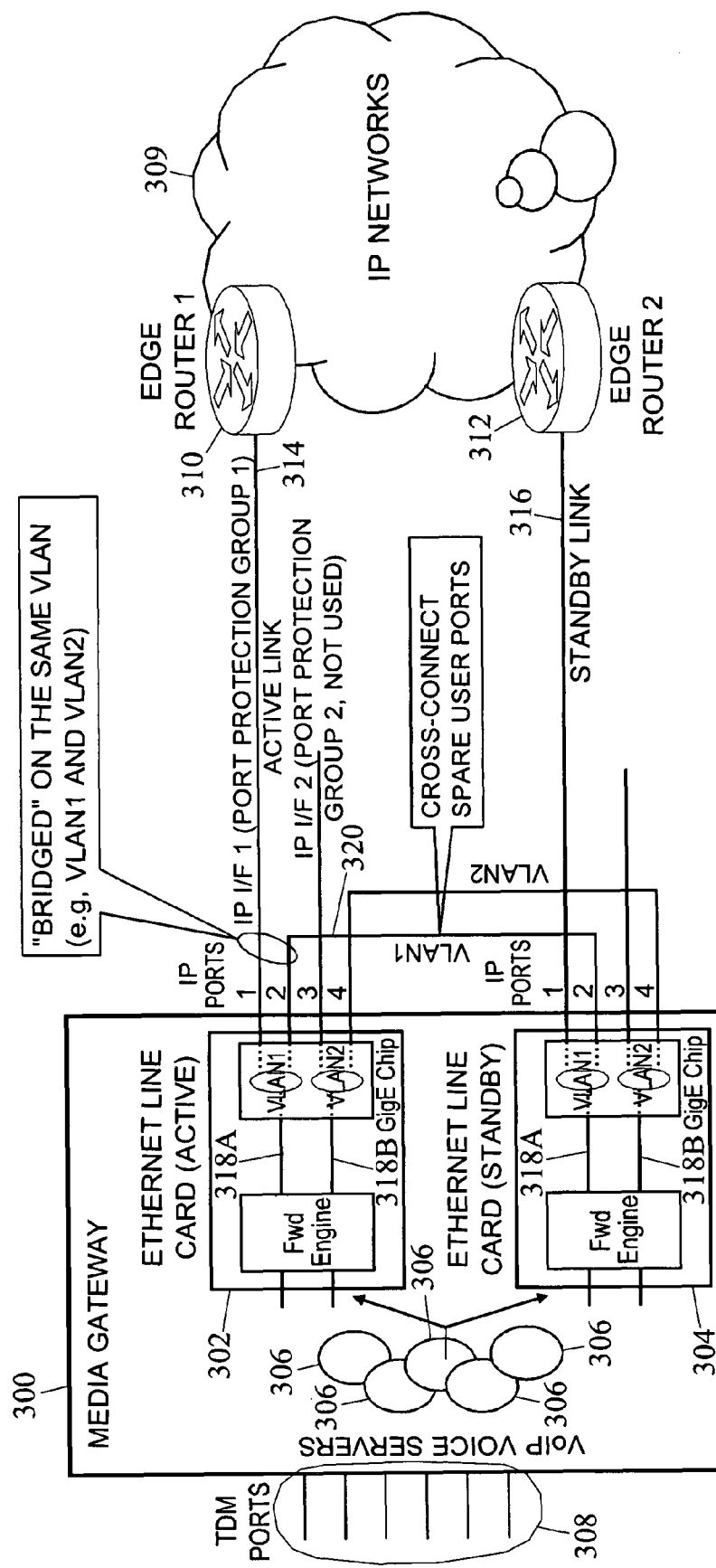
FIG. 3 is a block diagram illustrating an exemplary system for providing link redundancy in a media gateway according to an embodiment of the subject matter described herein.

The subject matter described herein includes methods, systems, and computer program products for providing link redundancy in a media gateway. FIG. 3 is a block diagram illustrating an exemplary system for providing link redundancy in a media gateway according to an embodiment of the subject matter described herein. Referring to FIG. 3, a media gateway 300 includes plural line cards 302 and 304 for connecting media gateway 300 to the network. In the illustrated example, two line cards are shown. However, it is understood that media gateway 300 may include more than two link or line cards without departing from the scope of the subject matter described herein. Media gateway 300 also includes a plurality of voice servers 306 for performing voice processing functions on TDM and IP-based media streams. Media gateway 300 further includes TDM ports 308 for connecting to voice channels of a TDM network.

In operation, media gateway 300 may receive instructions from a media gateway controller (not shown) to establish a voice link with a remote endpoint. The voice link may terminate at one of voice servers 306. The voice link may be forwarded through line card 302 or 304 to the remote endpoint. The voice link is typically bidirectional, as is common with most voice telephone calls. Accordingly, incoming voice traffic from the remote endpoint may be received through line card 302 or 304 and forwarded to the appropriate voice server 306 for processing. As stated above, in one implementation, the active line card maintains connection information regarding which voice server is associated with a particular connection and the standby line card does not maintain such information. Accordingly, when the active link to the remote endpoint fails, as will described in more detail below, traffic between the remote endpoint and media gateway 300 may proceed using the standby link, a standby line card, and the cross connect.

Figure 1:
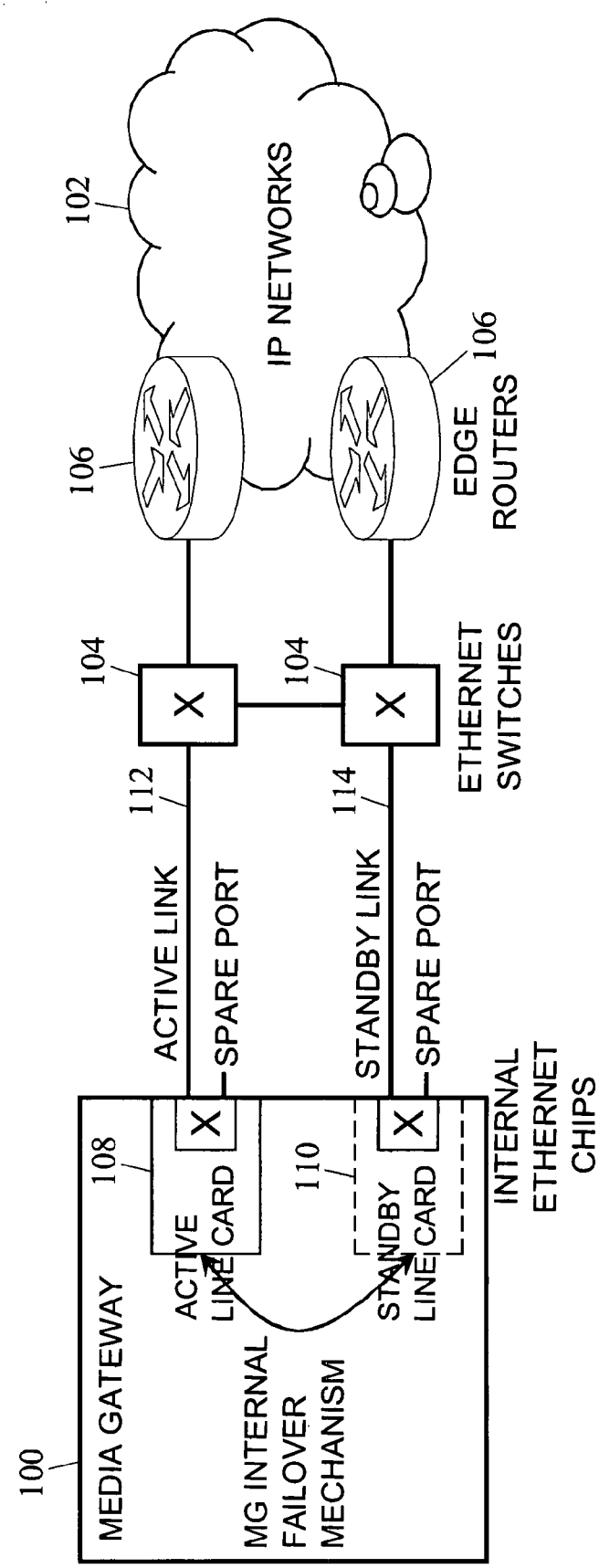
FIG. 1 is a block diagram illustrating a conventional solution for providing link redundancy using external Ethernet switches.
Figure 2:
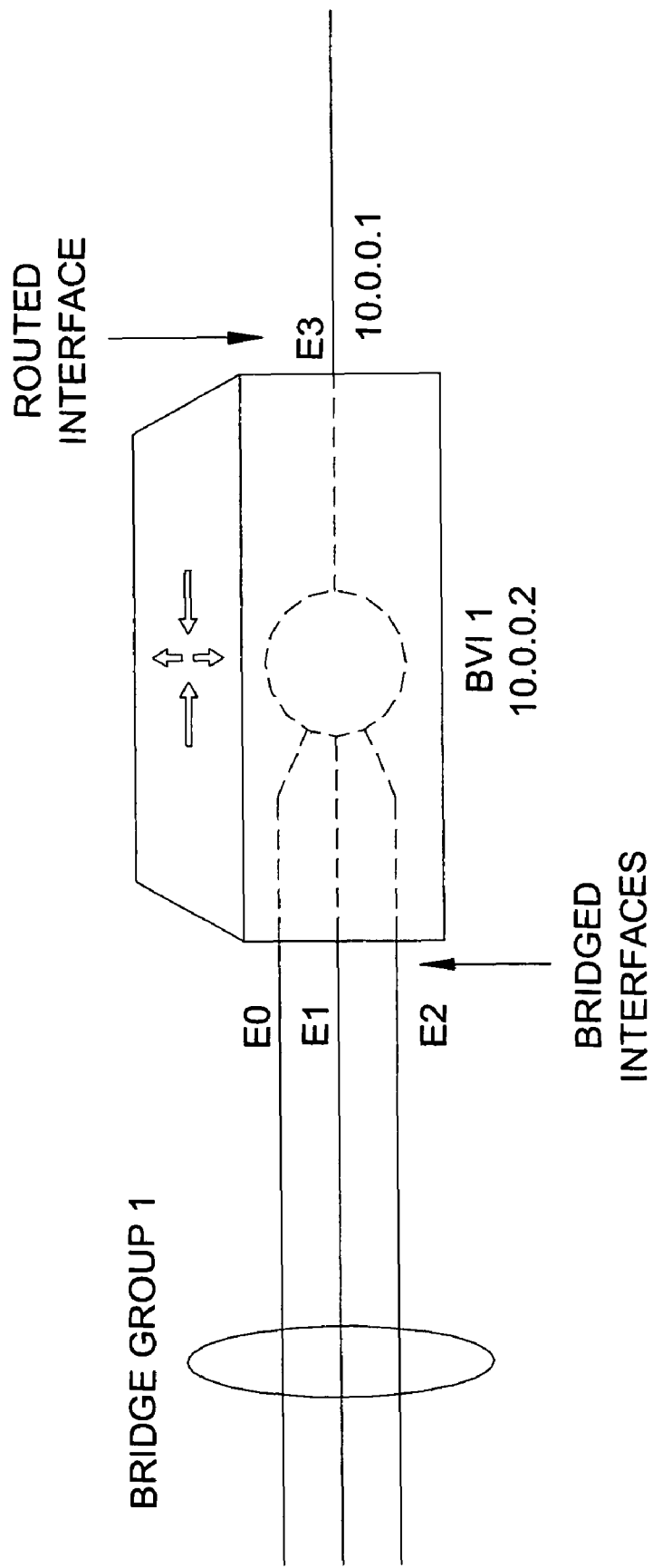
FIG. 2 is a block diagram illustrating a bridged virtual interface (BVI)

It should be noted that media gateway 300 may be connected to IP network 309 without the use of additional Ethernet switches to provide bridging, as illustrated in FIG. 1. Edge routers 310 and 312 perform IP routing functions for packets sent to and from media gateway 300.

In the illustrated example, media gateway 300 includes an active line card 302 connected to an active link 314 and standby line card 304 connected to standby link 316. Active card 302 and standby card 304 each include a plurality of IP ports, numbered 1-4, connected to the external network. In addition, each line card includes internal ports 318A and 318B connecting each line card to a forwarding engine and through a switching fabric (not shown) to voice servers 306.

In order to implement link redundancy, active link 314 and standby link 316 may be bridged using active line card 302 and standby line card 304. In one implementation, VLANs may be used to perform the bridging. For example, in FIG. 3, port 1 of active line card 302, port 2 of active line card 302, and internal port 318A of active line card 302 may be associated with the same VLAN as port 1 of standby line card 304, port 2 of standby card 304, and internal port 318A of standby line card 304. Port 1 of active line card 302 may be connected to the active link, and port 1 of standby card 304 may be connected to standby link 316. Ports 2 of active and standby line cards 302 and 304 may be connected to each other via a cross connect 320. In one implementation, cross connect 320 may be a network cable.

Although in the example illustrated in FIG. 3, active link 314 and standby link 316 are connected to different line cards in a media gateway, the subject matter described herein is not limited to such an embodiment. In an alternate embodiment, active link 314 and standby link 316 may be connected to different ports associated with the same line card in a media gateway. Such a solution would provide less hardware redundancy than the solution illustrated in FIG. 3, but would still operate using automatic bridging as described herein.

If a failure occurs between media gateway 300 and edge router 310 or edge router 312, the failure can be detected since links are connected between the media gateway and edge routers. Link failures are typically bidirectional, since, for electrical transmissions, bidirectional communications flow over the same cable. In optical communications, such as SONET communications, a failure may be unidirectional, since separate cables are provided for incoming and outbound communications. If a bidirectional failure occurs on active link 314, edge router 310 will notify the network that a particular destination (i.e., a voice server) is not reachable. Edge router 310 may notify the network using standard routing protocols, such as RIP or OSPF. The network will then begin routing traffic destined for the particular destination to edge router 312. Incoming traffic for the destination will proceed from edge router 312 over standby link 316 to standby line card 304. Since the traffic is associated with VLAN1, standby line card 304 will forward the traffic over cross connect 320 to active line card 302. Active line card 302 will then forward the traffic to the appropriate voice server. Outbound traffic arriving at line card 302 from a voice server 306 will be forwarded over cross connect 320 to standby line card 304. Standby line card 304 will then forward the traffic to the network over standby link 316.

If a failure is detected in one direction, for example on the inbound side of active link 314, the network will route inbound traffic to standby link 316 and standby line card 304. Standby line card 304 will then forward the inbound traffic to active line card 302 using VLAN1. Outbound traffic arriving at active card 302 will be forwarded over the outbound side of active link 314 using VLAN1. Thus, a card switchover is not required.

If a unidirectional failure occurs on the outbound side of active link 314, inbound traffic from the network 309 will continue to use the inbound side of active link 314. Active line card 302 will forward the inbound traffic to the appropriate voice server. Outbound traffic arriving at line card 302 will be forwarded to line card 304 using VLAN1 and cross connect 320. Line card 304 will then forward the traffic to the network. Again, bridging occurs automatically through normal VLAN operation and cross connect 320 without requiring card switchover.

In the illustrated example, IP ports 1 and 2 on each card form a protection group. Similarly, IP ports 3 and 4 on each card also form a protection group. With this internal port bridging solution, a media gateway can achieve individual link protection by avoiding switching over between cards. Only when two links of the same protection group are down at the same time is a switchover between cards required. When a card switchover occurs, the standby and now new active Ethernet line card sends gratuitous ARP requests to refresh router ARP entries, so that incoming traffic will be directed to the standby link which has now become active. If an administrative switchover between Ethernet line cards occurs, the entire line card function is switched between line cards. However, the internal port bridging solution described herein will remain functioning by bridging any traffic from the current active Ethernet line card to the former active Ethernet line card. If the cross link between two line cards fails, the link on the standby card may be taken out of service to ensure that incoming traffic will completely follow the active path.

Figure 4:
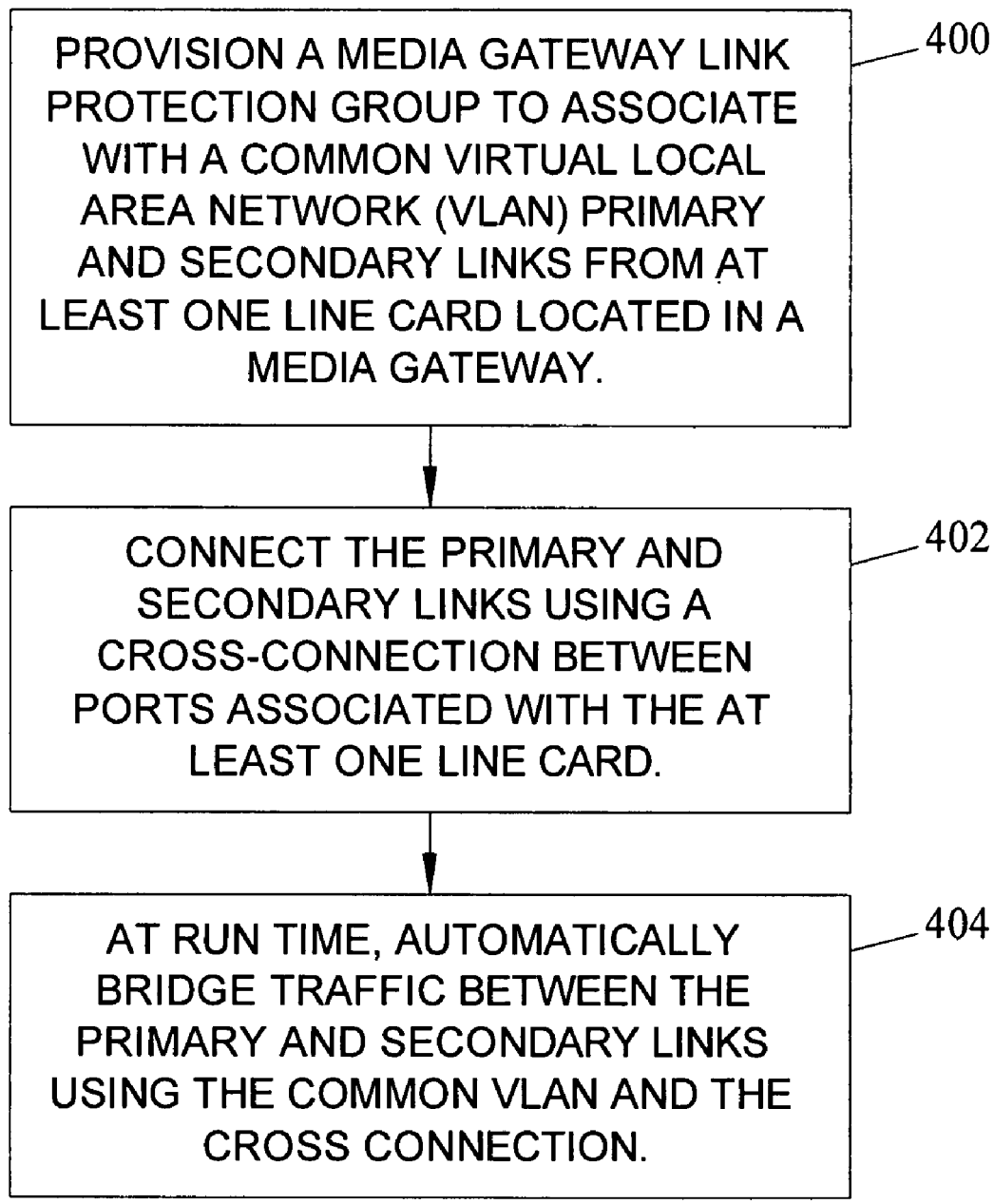
FIG. 4 is a flow chart illustrating exemplary overall steps for providing link redundancy in a media gateway according to an embodiment of the subject matter described herein.

FIG. 4 is a flow chart illustrating exemplary overall steps for providing link redundancy in a media gateway according to an embodiment of the subject matter described herein. Referring to FIG. 4, in step 400, a media gateway link protection group is provisioned to associate with a common VLAN primary and secondary links associated with at least one line card in a media gateway. For example, referring to FIG. 3, active link 314 and standby link 316 may form a link protection group using VLAN1.

Returning to FIG. 4, in step 402, the primary and secondary links are connected to each other using a cross connection between ports associated with the at least one line card. Referring again to FIG. 3, cross connect 320 may cross-connect unused ports of active and standby cards 302 and 304, thereby connecting active link 314 and standby link 316.

Returning to FIG. 4, in step 404, at run time, traffic is automatically bridged between active link 314 and standby link 316 using the common VLAN and the cross connection.

For example, bridging occurs automatically, regardless of the failure of active link 314. Incoming traffic from the network received by active card 302 is automatically bridged to standby line card 304 using normal MAC flooding procedures within VLAN1 and cross connect 320. Standby line card 304 ignores this incoming traffic unless a card switchover occurs and standby card 304 becomes active. Similarly, outbound traffic sent from voice servers 306 to active card 302 to be forwarded over the network is similarly bridged to standby card 302 using VLAN 1 and cross connect 320. Normal MAC flooding procedures would determine whether this traffic be forwarded over standby link 316, even if active link 314 is available. Such procedures may either be followed or suppressed, depending on how the network treats the traffic on standby link 316.

If active link 314 fails, outbound traffic from voice servers 306 that would have entered the network via active card 302 will reach the network through standby card 304 using the automatic bridging mechanism described in the preceding paragraph. Similarly, inbound traffic that would have reached active card 302 vial active link 314 will reach active card 302 via standby link 316, standby card 304, and cross connect 320 using automatic bridging as described in the preceding paragraph. Thus, the subject matter described herein uses automatic bridging between line cards to achieve link redundancy in a media gateway and does not require card switchover to achieve the redundancy.

Figure 5:
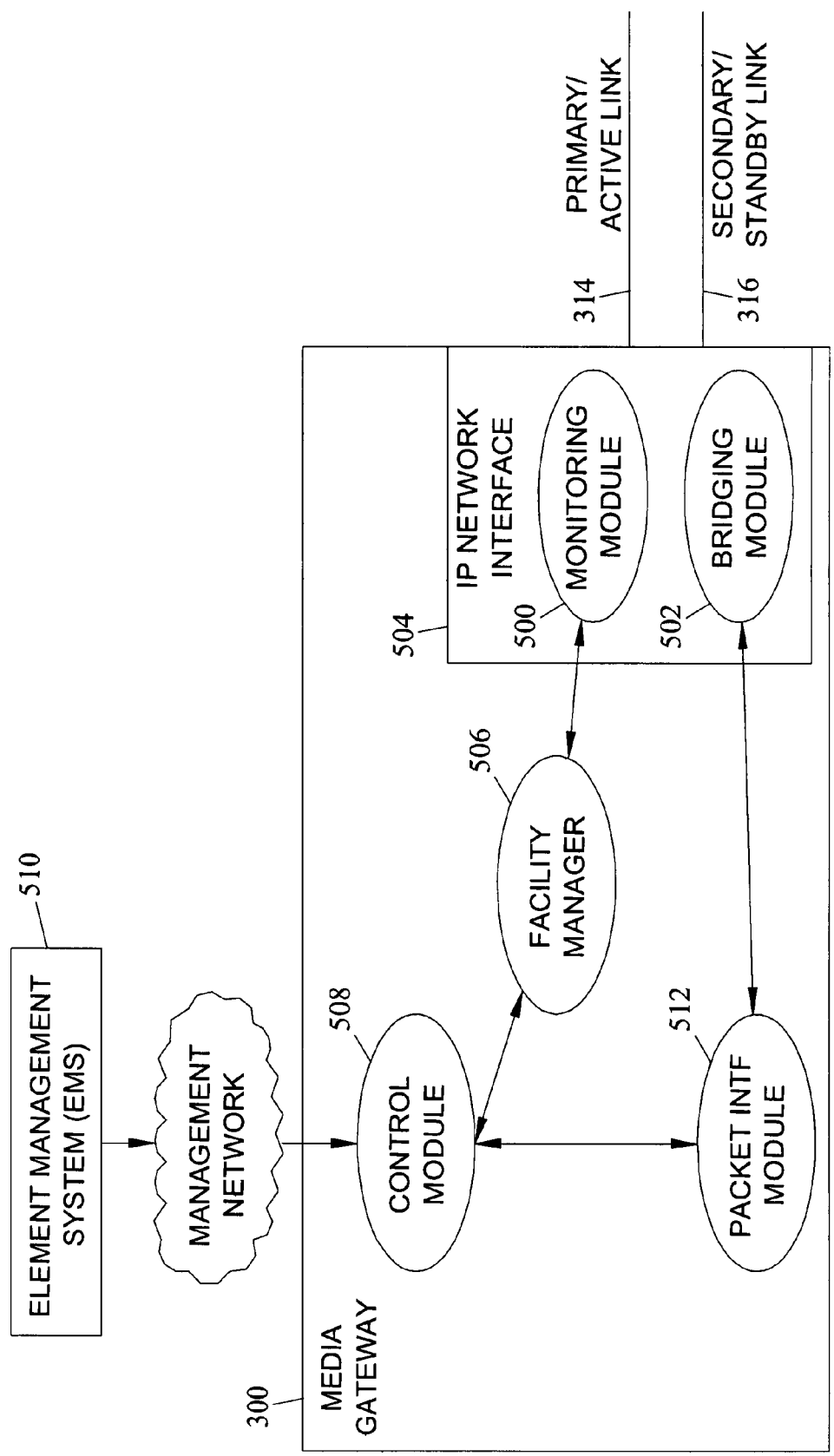
FIG. 5 is a block diagram illustrating exemplary components of a media gateway for providing link redundancy in a media gateway according to an embodiment of the subject matter described herein.

FIG. 5 is a block diagram illustrating exemplary internal components of media gateway 300 for providing link redundancy according to an embodiment of the subject matter described herein. Referring to FIG. 5, media gateway 300 includes a monitoring module 500 and a bridging module 502. Monitoring module 500 and bridging module 502 may be implemented on an IP network interface 504, which may include plural Ethernet line cards 302 and 304, as illustrated in FIG. 3. Monitoring module 500 may monitor links to determine whether a link failure has occurred and whether the link comes back up. A facility manager 506 communicates with monitoring module 500 to determine whether card switchover is required and whether gratuitous ARP messages should be sent. A control module 508 controls the overall operation of media gateway 300. Control module 508 keeps track of link status and forwards link status information to a management system, such as element management system 510 for logging. A packet interface module 512 may communicate with bridging module 502 to implement packet bridging.

In one exemplary implementation, the operation of the subject matter described herein can be divided into events that occur at provisioning time and at run time. At provisioning time, protection groups are provisioned in order to provide link redundancy. Provisioning commands may be issued by an operator through a management interface, such as EMS 510. The provisioning commands may include creation, modification, and deletion of link protection groups, which may include two links. Each link may be identified by full link ID. In one implementation, a link ID may include a node ID, an interface ID, and a link ID. A protection group may be provisioned as a reverted or a non-reverting group.

The provisioning command may be received by control module 508 at media gateway 300. Control module 508 may check the validity of the received command and update a database on media gateway 300 with the provision protection group. Control module 508 may pass the command to packet interface module 512, which passes the command to bridging module 502 to implement the actual bridging.

At runtime, card switchover may be triggered by an event, such as a double link failure. Monitoring module 500 may detect the failure event. While traffic bridging may occur automatically as described above, a set of actions may be required to be performed at the interface card or at control module 508 when a single link failure occurs. The actions may be taken by facility manager 506. The actions may include determining whether a card level switchover needs to occur (in the case of a double failure) and whether gratuitous ARP messages are required to be sent. Link failure may be reported to facility manager 506 and then to control module 508. Control module 508 may report the failure to element management system 510.

Figure 6:
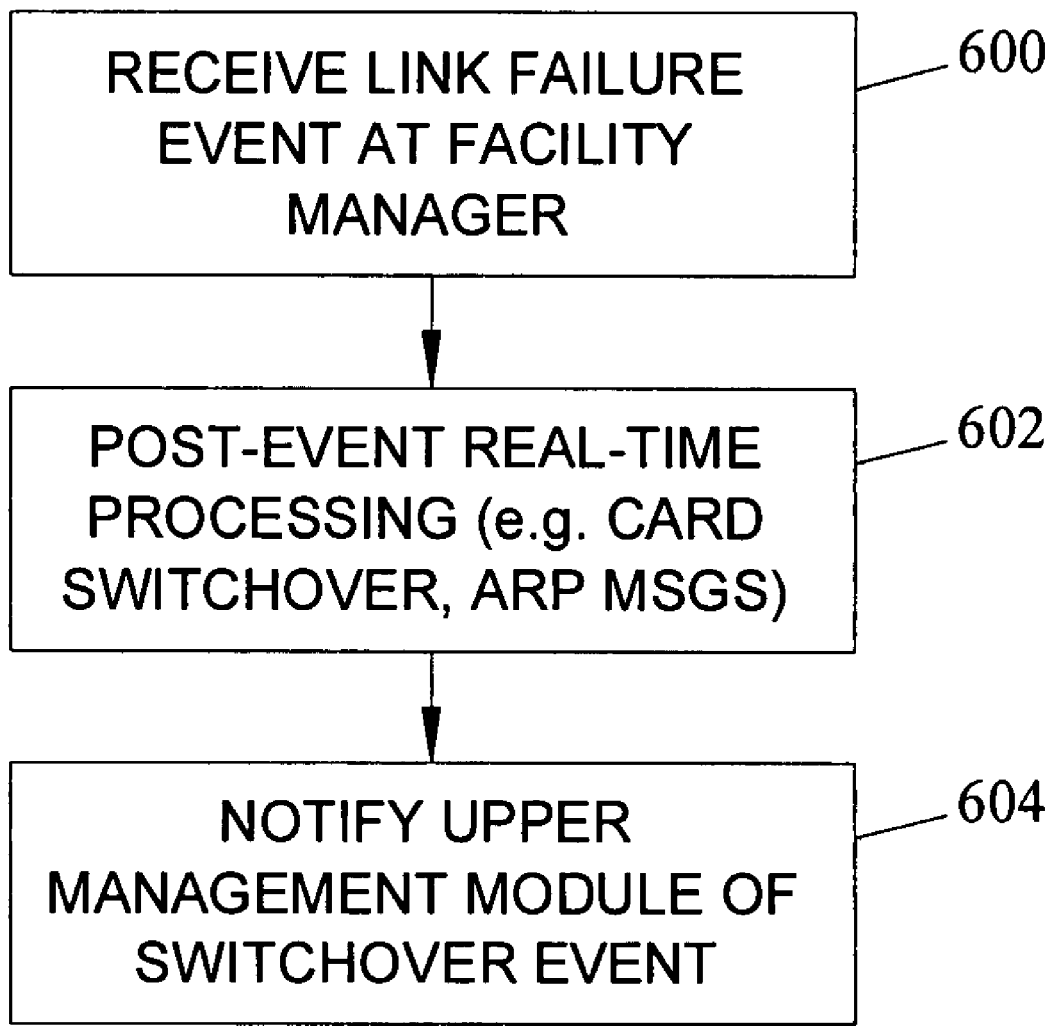
FIG. 6 is a flow chart illustrating exemplary overall steps for providing link redundancy using the components illustrated in FIG. 5.

FIG. 6 is a flow chart illustrating exemplary overall steps for providing link redundancy using internal bridging according to an embodiment of the subject matter described herein. Referring to FIG. 6, in step 600, a link received at facility manager 506. Referring to FIG. 5, monitoring module 500 may send notification of the link failure to facility manager 506.

Returning to FIG. 6, in step 602, post-event real time processing is performed. Examples of post-event real time processing include determining card switchover is required and whether sending of ARP messages is required.

In block 604, an upper management module is notified of the switchover event. Referring to FIG. 5, control module 508 may notify element management system 510 of a link failure.

Figure 7:
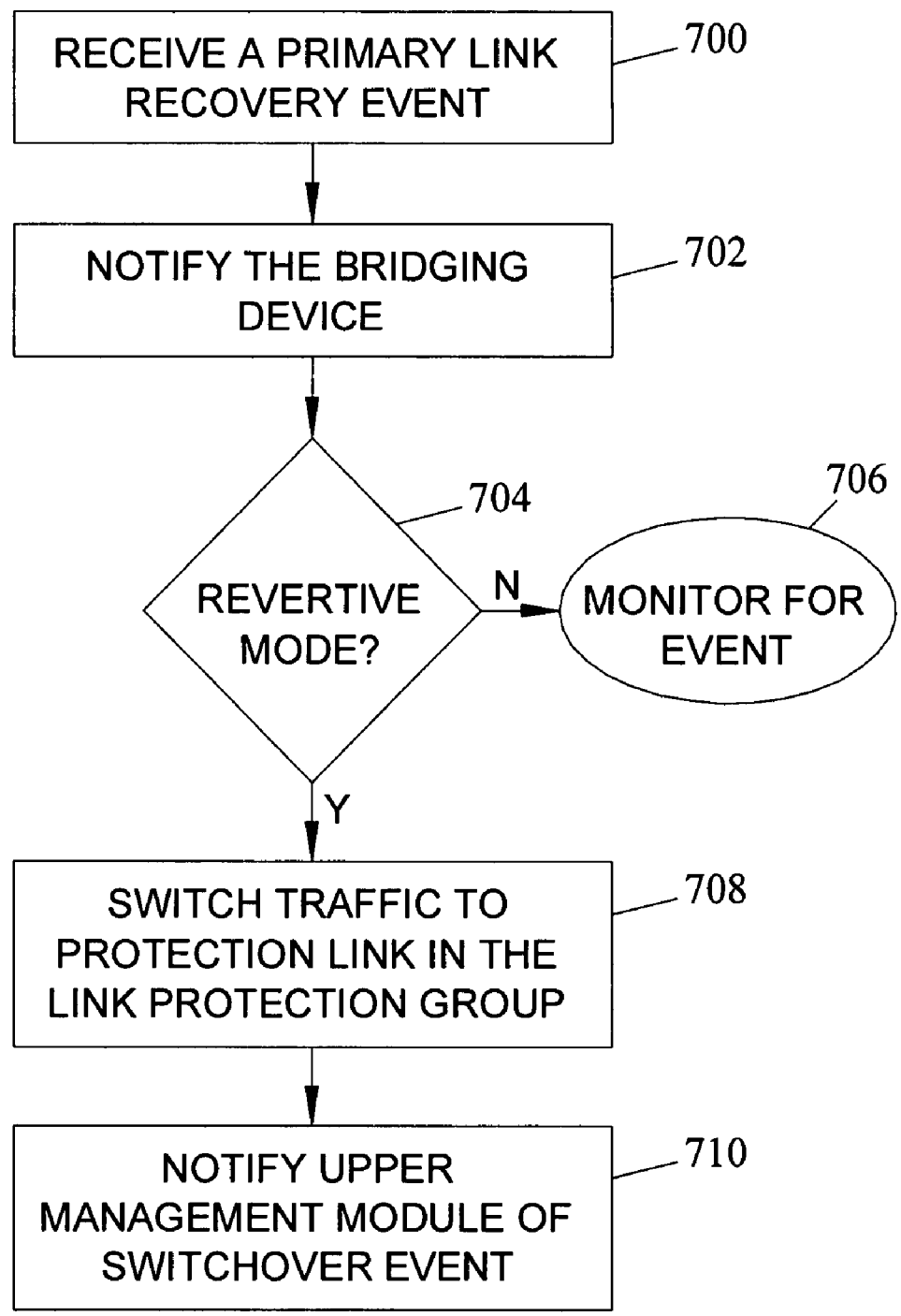
FIG. 7 is a flow chart illustrating exemplary steps for providing link redundancy in a revertive mode according to an embodiment of the subject matter described herein.

As stated above, a protection group may be provisioned as a revertive or non-revertive group. A non-revertive group does not switch a card from active mode to standby mode and back to active mode. A revertive group switches cards between standby and active modes if an active link that was down recovers. FIG. 7 is a flow chart illustrating exemplary steps for functioning in revertive or non-revertive mode according to embodiment of the subject matter described herein. Referring to FIG. 7, in block 700, a primary link recovery event is detected. In block 702, a bridging device is notified. The bridging device may be bridging module 502 illustrated in FIG. 5. In step 704, it is determined whether the protection group is functioning in revertive mode. If the protection group is not functioning in revertive mode, control proceeds to block 706 where the new active link is monitored for an event. In other words, reversion to the former active link does not occur.

In block 704, if the protection group is operating in revertive mode, control proceeds to block 708 where traffic is switched to protection link in the protection group. The protection link is the former active link. In block 710, upper management is notified of the module switchover event.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for implementing link redundancy in a media gateway, the method comprising:
provisioning a media gateway link protection group to associate, with a common virtual local area network (VLAN), primary and secondary links respectively connected to ports of different line cards located in a media gateway;
connecting the primary and secondary links using a cross-connection between ports of the line cards that are separate from the ports of the line cards to which the primary and secondary links are connected; and
at run time, automatically bridging traffic using the common VLAN and the cross connection by forwarding, via the cross-connection, incoming traffic for the common VLAN received over the secondary link to the line card to which the primary link is connected and by forwarding, via the cross-connection, outgoing traffic for the common VLAN received at the line card to which the primary link is connected to the line card to which the secondary link is connected; and
wherein each line card includes at least first and second ports that form a first protection group and third and fourth ports that form a second protection group, and wherein a card switchover occurs when links associated with both ports in a protection group fail at the same time.

2. A method for implementing link redundancy in a media gateway, the method comprising:
provisioning a media gateway link protection group to associate, with a common virtual local area network (VLAN), primary and secondary links from at least one line card located in a media gateway;
connecting the primary and secondary links using a cross-connection between ports associated with the at least one line card that are separate from the ports to which the primary and secondary links are connected;
at run time, automatically bridging traffic using the common VLAN and the cross connection, wherein the at least one line card includes an active line card connected to the primary link and a standby line card connected to the secondary link and wherein the cross connection connects a port on the standby line card with a port on the active line card; and
associating with the common VLAN:
a first port on the active line card connected to primary link;
a first port on the standby line card connected to the secondary link;
second ports on the first and second line cards associated with the cross connection; and
internal ports associated with the active and standby line cards.

3. The method of claim 2 wherein provisioning a link protection group includes provisioning a link protection group in a revertive mode and wherein the method further comprises, when the active line card is functioning in a standby mode, in response to a recovery on the primary link, switching the active card to operate in an active mode.

4. The method of claim 2 wherein provisioning a link protection group includes provisioning the link protection group in a non-revertive mode, where, when the active line card is functioning in standby mode and the active link recovers, the active line card remains in standby mode.

5. The method of claim 2 wherein the cross connection comprises a network cable.

6. The method of claim 2 wherein automatically bridging traffic between the primary and secondary links includes, receiving incoming traffic on the standby line card and forwarding the incoming traffic to the active line card via the cross connection.

7. The method of claim 6 wherein automatically bridging traffic between the primary and secondary links includes forwarding outgoing traffic from the active line card to the standby line card over the cross-connection and from the secondary line card, over the standby link, and to a network.

8. The method of claim 1 wherein the automatic bridging occurs independently of a link failure.

9. The method of claim 2 comprising maintaining, on the active line card, connection information regarding VoIP connections between at least one voice server in the media gateway and at least one remote endpoint.

10. A media gateway comprising:
  a plurality of line cards within the media gateway having ports for connecting to links, wherein a first port of a first line card is connected to an active link and a first port of a second line card is connected to a standby link;
  a cross connect connecting the active and standby links via the first and second line cards by connecting second ports of the first and second line card that are separate from the first ports to which the active and standby links are connected; and
  wherein the first and second line cards are adapted to automatically bridge traffic using a common VLAN and the cross connect by forwarding, via the cross connect, incoming traffic for the common VLAN received over the standby link to the first line card and by forwarding, via the cross connect, outgoing traffic for the common VLAN received at the first line card to the second line card; and
  wherein each line card includes at least first and second ports that form a first protection group and third and fourth ports that form a second protection group, and wherein a card switchover occurs when links associated with both ports in a protection group fail at the same time.

11. A media gateway comprising:
  at least one line card within the media gateway being connected to an active link and a standby link;
  a cross connect for connecting the active and standby links via the at least one line card; and
  wherein the at least one line card is adapted to automatically bridge traffic between the active and standby links using a common VLAN and the cross connect, wherein the at least one line card comprises an active line card connected to the active link and a standby line card connected to the standby link and wherein the cross connect connects ports of the active and standby line cards, and wherein the active and standby line cards are adapted to associated with the common VLAN:
  a first port on the active line card connected to the active link;
  a first port on the standby line card connected to the standby link;
  second ports on the active and standby line cards connected to the cross connect; and
  internal ports on the active and standby line cards.

12. The media gateway of claim 11 wherein the active line card is adapted to function in a revertive mode wherein, when the active line card is operating in standby mode and the active link recovers, the active line card is adapted to return to active mode.

13. The media gateway of claim 11 wherein the active line card is adapted to function in a non-revertive mode wherein, when the active line card is operating in standby mode and the active link recovers, the active line card is adapted to remain in standby mode.

14. The media gateway of claim 11 wherein the cross-connect comprises a network cable.

15. The media gateway of claim 11 wherein the active line card is adapted to automatically forward outbound traffic from the active line card to the standby line card via the cross connect.

16. The media gateway of claim 11 wherein the standby line card is adapted to automatically bridge inbound traffic from the standby line card to the active line card via the cross connect.

17. The media gateway of claim 11 wherein the active line card is adapted to automatically bridge outbound traffic from the active line card to the standby line card via the cross connect.

18. The media gateway of claim 11 wherein the at least one line card is adapted to automatically bridge the traffic independently of failure of the active link.

19. A computer program product comprising computer executable instructions embodied in a computer readable medium that when executed by a processor of a computer control the computer to perform steps comprising:
  provisioning a media gateway link protection group to associate, with a common virtual local area network (VLAN), primary and secondary links respectively connected to ports of different line cards located in a media gateway;
  connecting the primary and secondary links using a cross-connection between ports of the line cards that are separate from the ports of the line cards to which the primary and secondary links are connected; and
  a run time, automatically bridging traffic using the common VLAN and the cross connection by forwarding, via the cross-connection, incoming traffic for the common VLAN received over the secondary link to the line card to which the primary link is connected and by forwarding, via the cross-connection, outgoing traffic for the common VLAN received at the line card to which the primary link is connected to the line card to which the secondary link is connected; and
  wherein each line card includes at least first and second ports that form a first protection group and third and fourth ports that form a second protection group, and wherein a card switchover occurs when links associated with both ports in a protection group fail at the same time.

20. The computer program product of claim 19 wherein automatically bridging the traffic includes automatically bridging the traffic independently of a failure of the primary link.

* * * * *